Figure 1:
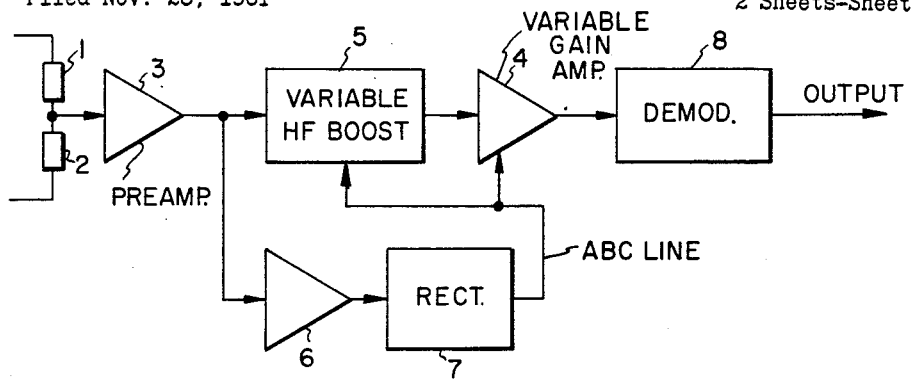

July 6, 1965  F. SCHWARZ  3,193,681
ELECTRONIC PROCESSING CIRCUITS FOR SCANNING SYSTEMS
Filed Nov. 28, 1961  2 Sheets-Sheet 1

INVENTOR.
FRANK SCHWARZ

BY
ATTORNEY

INVENTOR.
FRANK SCHWARZ

United States Patent Office 3,193,681
Patented July 6, 1965

3,193,681
ELECTRONIC PROCESSING CIRCUITS FOR SCANNING SYSTEMS
Frank Schwarz, Stamford, Conn., assignor to Barnes Engineering Company, Stamford, Conn., a corporation of Delaware
Filed Nov. 28, 1961, Ser. No. 155,439
7 Claims. (Cl. 250—83.3)

This invention relates to improved electronic processing circuits to compensate for relatively slow detector rise times. More particularly circuits of the invention are useful in connection with scanning devices which scan across sharp radiation discontinuities. This is encountered, for example in horizon sensors, radiation actuated dimensional gages and the like.

In recent years there have been important advances in instruments which scan across sharp discontinuities such as horizon sensors for satellites and other space vehicles and dimensional gages for measuring extruded materials such as steel rods, glass tubing and the like. Typical horizon sensors are described in the August 1961 issue of Space/Aeronautics in an article by Wormser beginning on page 5 and in U.S. Patent No. 3,020,407, February 6, 1962. A typical dimensional gage especially useful for measuring rapidly moving extruded materials such as hot steel rods and the like is described in the patent to Astheimer, No. 3,003,064, October 3, 1961. In each of these cases the instrument is effectively measuring a scan across a body with edges showing sharp radiation discontinuities.

If radiation detectors which translate radiation into electrical signals have an extremely high rate of rise, that is to say a very short time constant, and if the material scanned has uniform radiation characteristics, the result will be perfectly rectangular waves in the detector output which by simple electronic circuitry involving a reference frame switching pulse determine the attitude of a vehicle in a horizon sensor or by integration or summing determine the width of a piece of material such as a rapidly moving extruded steel rod in the case of dimensional gages. Unfortunately these ideal conditions usually do not occur. This is especially true when the scanning instrument is using infrared as is usually the case with most horizon sensors and is very frequently the case with dimensional gages. Infrared detectors especially thermistor bolometers have very definitely limited time constants, usually in excess of a millisecond. This means that when the edge of the material to be scanned is encountered the rise of the signal from the detector is slow and instead of the ideal rectangular wave the output is more of a trapezoid with sloping leading and trailing edges.

If the slopes of the two edges are of equal magnitude it is possible to effect good compensation by sampling the output half way between background and maximum. For example, this is done in the electronic circuits illustrated in the Astheimer patent referred to above. Unfortunately this solution cannot always be used. With horizon sensors very serious problems are presented by cold clouds or the very great radiation differences between night and day especially if the scan is across an object such as the moon's disc where the extremes in temperature, and hence infrared radiation, between day and night are very great. Similar problems are presented with the earth scans where the scan may cross both polar and temperate regions. The difference in radiation encountered as the scan proceeds may be as great as or greater than one half the maximum radiation. In such cases, of course, output circuits which sample the output signal at the half way mark can introduce completely false horizons. In the case of dimensional gages edge effects can be extremely serious and unfortunately if the whole rise and fall time from background to maximum signal and vice versa is considered the slopes of leading and trailing edges may be quite different. Thus a trailing edge may decay exponentially, introducing an error.

One approach to the solutions of the above problems forms a subject matter of the copending application of Falk, Serial No. 149,730 filed November 2, 1961. Problems arising from cold clouds in the horizon sensors and the like are eliminated by sampling the signal not half way between maximum and background but as near the background as is practical in view of background noise which is never completely eliminated. A trigger circuit is used which is triggered at a certain level and which therefore produces an electrical quantity that does not change with relative level above the triggering value. Portions of the leading and trailing edges by which the measurement of the trigger circuit output is in error are sensed in other types of electronic circuits and added algebraically to the output of the trigger circuit thus eliminating the errors. The circuits used, though straightforward, are somewhat complex and so a simpler solution, though perhaps not theoretically quite as accurate, is of practical importance. After all, different instruments have different requirements for precision and where there is sufficient tolerance there is an economic advantage in using simpler approaches. The present invention deals with the somewhat simpler electronic solution of the edge problem than in the Falk application above referred to. It shares with it the feature of measuring on a level quite near to that of the background but its approach to a solution is by a different principle.

Theoretically it is possible to shape almost any wave so that it will become rectangular by suitable high frequency boost. When this approach is used in the processing of the output signals of scanners, either horizon sensors or dimension gages or similar instruments, there is an immediate practical drawback. At the beginning of rise of the leading edge and decay of the trailing edge of the output wave a high degree of high frequency boost results in overaccentuating detector and background noise and immediately introduces so great an inaccuracy that the simple use of high frequency boost does not lead to a practically useful result. The present invention, while utilizing a high frequency boost, does not encounter the problems of noise accentuation. The invention is based essentially on an automatically controlled boost, little or no boost at low signals and an increasing boost as the signal level rises. This will be referred to throughout the specification as automatic boost control and will be abbreviated ABC. When the signal is near the noise level at the beginning of the leading edge or end of the trailing edge little or no boost is supplied and no problem is encountered with false signals from noise. As the level rises, however, more and more high frequency boost is imparted and the net result is that over a large portion of the wave from near background through high levels and back to background the wave approaches quite closely to the shape of a rectangular wave, that is to say as far as its leading and trailing edges are concerned. Of course, in a horizon sensor that encounters drastically different radiation conditions during the scan such as low clouds, day/night terminators and the like, there will be no straight top to the wave but the measurement runs from so near the beginning of the scan to so near the end that the accuracy is very high and with simple automatic boost control circuits excellent response can be obtained without the complications which are required in the theoretically more perfect compensation circuits of the Falk application above referred to.

The introduction of ABC into the processing circuits of the wave pulse output from a scanning detector is a new organization of electronic circuits to produce the new effect of the present invention. It is, however, an advantage that the circuit elements used are not in themselves either unduly complex or unreliable.

In common with many electrical circuits the present invention can be used to compensate for irregularities in either positive or negative pulses. The compensation is the same and all that is changed is the polarity of the electrical quantities involved. This is of practical importance. Most horizon sensors and dimensional gages operate on materials which radiate more intensely than do their backgrounds. In other words, the detector output is in the form of positive pulses as often chosen when biasing a detector which scans a warm target. However, there is an important field for the reverse type of instrument, for example, there are certain ultraviolet radiations in which the space adjacent a disc of certain bodies such as the moon radiate more strongly than does the surface of the body itself. Similarly there are a number of gaging situations in which the material to be gaged radiates less strongly than its background or the cold material may be silhouetted against a warm background source. It is an advantage of the present invention that its compensation for sloping leading and trailing edges of the wave form is just as effective whether the pulse is positive or negative.

The most important field in which the present invention is useful is in compensating in the outputs of scanning devices involving radiation detectors. It should be realized that the circuits which constitute the novelty of the present invention are not concerned with the past history of the wave shapes reaching their inputs and they will compensate for sloping rising and trailing edges regardless of the nature of the portion of the instrument which produced these waveforms.

Figure 2:
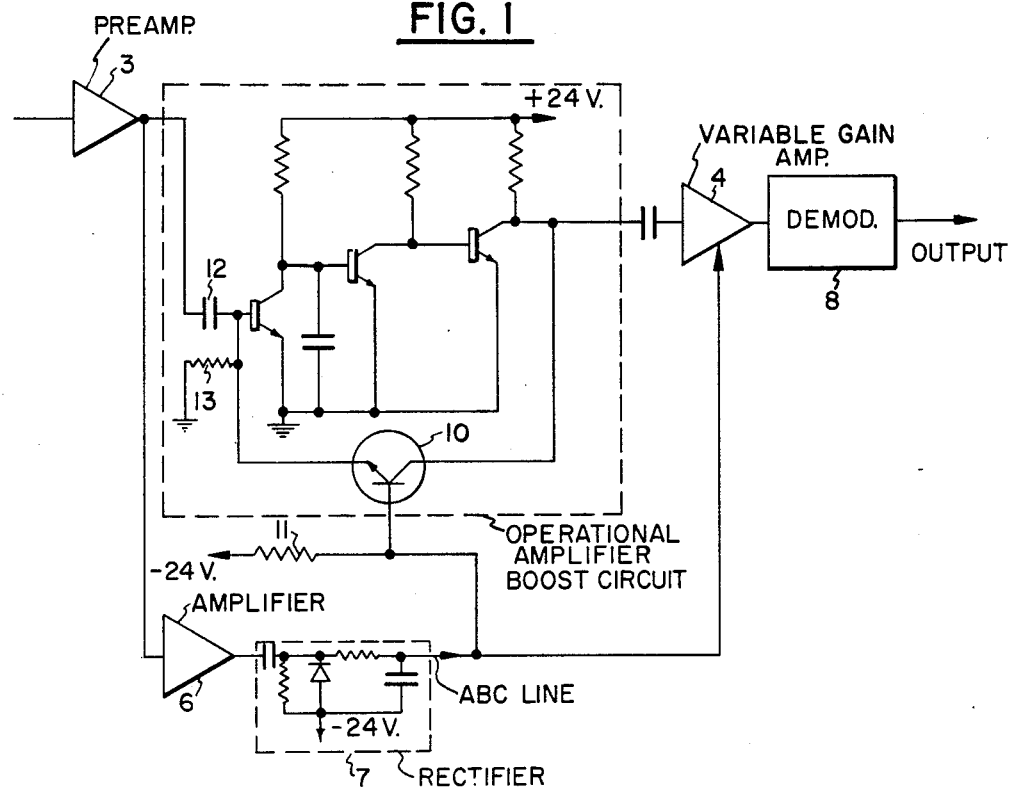
Figure 3:
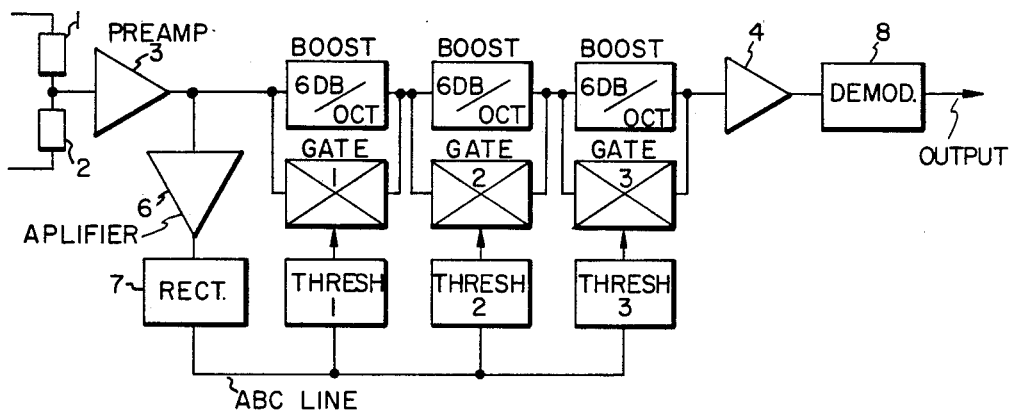
Figure 4:
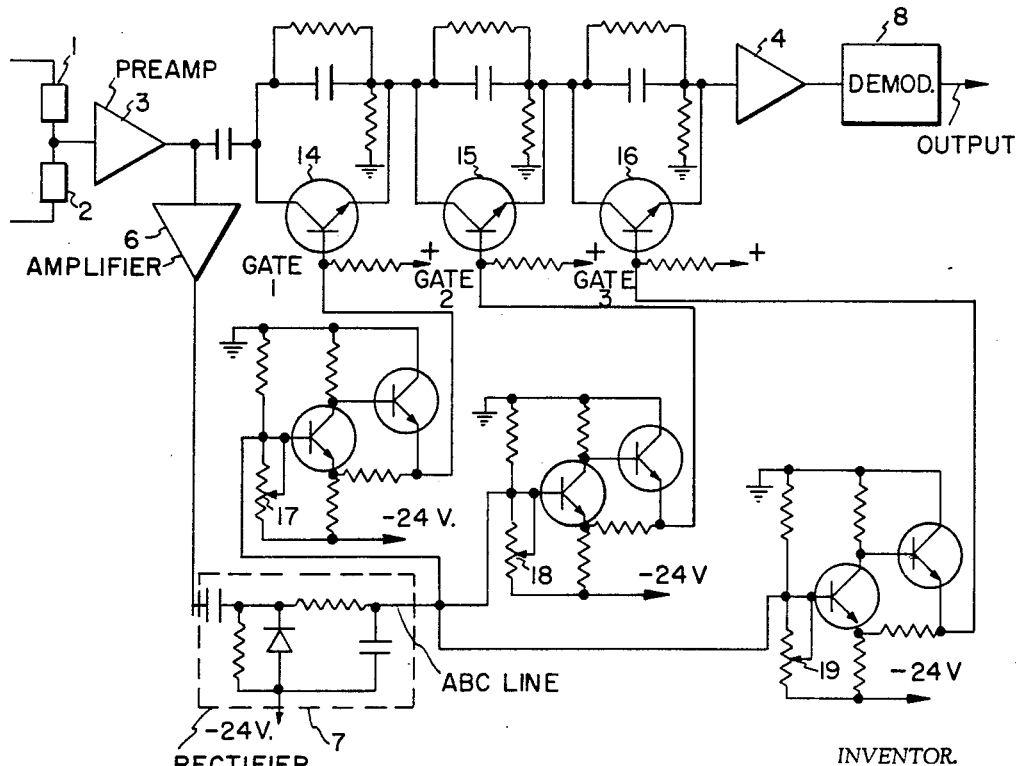

The invention will be described in greater detail in conjunction with processing circuits for scanning devices such as horizon sensors and dimensional gages and more particularly in conjunction with the drawings in which:

FIG. 1 is a block diagram for continuous ABC;
FIG. 2 is a partial schematic of the portions of the circuits in which the control is effected;
FIG. 3 is a block diagram of a stage varied ABC;
FIG. 4 is a partial schematic of the circuits of FIG. 3.

FIG. 1 shows two radiation detectors 1 and 2, for example thermistor flakes in a compensated thermistor bolometer, and a preamp 3. These elements which are standard in almost all scanning devices using this type of detector are shown merely as illustrations of elements which will produce a trapezoidal wave requiring compensation by the present invention. To simplify the description it will be assumed that we are dealing with a positive pulse such as is produced in a horizon sensor described above or a gage as described in the Astheimer patent when gaging a hot steel rod. The output of the preamplifier 3 passes into an amplifying circuit which is composed of two parts, a variable gain amplifier 4 and an ABC circuit 5. Another portion of the output of the preamp 3 passes through another amplifier 6 and rectifier 7 producing a signal which determines the gain of the amplifier 4. Finally the output of amplifier 4 is demodulated in conventional circuits 8 and the output constitutes the final signal.

FIG. 2 illustrates the schematics of elements 5 and 7. The greater the signal in preamplifier 3 the greater the output of the amplifier 6 and hence the higher the ABC signal from the rectifier 7. The schematic of the latter is shown in FIG. 2 and is self-explanatory. The signal coming into the element 5 first enters an operational amplifier which is shown as cascaded common emitter transistors of more or less standard design. Control is effected, however, by a degenerative feedback loop through a transistor 10. It should be noted that the elements of the variable boost circuit 5 are shown in FIG. 2 enclosed by dashed lines. Transistor 10 is provided with a normal base current from a source (not shown) through resistor 11. The base is also connected to the ABC line which varies the current flowing through it and hence the degree of feedback. This in turn influences the high frequency boost or differentiating circuit formed of capacitor 12 and the variable resistance of transistor 10. The greater the signal in the ABC line the greater the boost of high frequencies. 13 is a resistance providing a return path to ground for the emitter of transistor 10.

Although FIG. 2 shows the ABC line going also into the variable gain amplifier 4 this is not absolutely essential. It can be omitted and the amplifier operate at constant gain. However, it is advantageous also to maintain constant gain irrespective of the amount of boost used in the system in accordance with signal level and FIG. 2 therefore shows the more elaborate circuit which is often desirable.

FIGS. 1 and 2 illustrate a modification in which ABC variation is continuous. This has some advantages but also some drawbacks. For some purposes stage variation offers greater reliability and stability. Such a stage device is shown in FIG. 3 the same elements bearing the same numbers as in FIGS. 1 and 2. It will be noted that instead of a variable high boost circuit 5 there are three boost networks in series each having six db/octave boost. They are actuated by three gates which in turn are actuated by ABC line signal of three different levels which are indicated by three blocks in FIG. 3 marked thresholds. These circuits respond to different levels of ABC voltage, each one producing a signal which operates its gate.

Considering FIG. 3 for a moment the gates are normally closed, that is to say they short circuit their respective boost networks. As the signal from amplifier 3 rises, so does the level in the ABC line and first one, then two and finally three gates are opened introducing their respective boost circuits and providing for zero boost, 6 db, 12 db and 18 db. The amplifier 4 is, of course, of fixed gain.

The actual circuits of the gates and thresholds are shown in FIG. 4. The gates are simple transistors 14, 15 and 16 biased to saturation current. They effectively short circuit their respective boost circuits which are of conventional RC configuration shown in FIG. 4 and are self-explanatory. At first the signal in the ABC line is too low to affect any of the threshold circuits which are made up of two transistors each, the threshold at which they operate being controlled by their input potentiometers 17, 18 and 19. As the voltage in the ABC line rises first the input at the potentiometer 17 reaches the point at which the transistors conduct putting a bias on the base of transistor 14 resulting in cutoff. The first of the boost networks is now in series and there is a high frequency boost of 6 db/oct. As the signal increases the input at potentiometer 18 is reached, transistor 15 is cut-off and the boost is 12 db. Finally the threshold input of potentiometer 19 is reached which results in the biasing of transistor 16 to cutoff and increasing the boost to 18 db.

In the figures transistors have been illustrated but, of course, tubes can be used. Also, in FIG. 2 the reactance transistor 10 behaves as a resistor. It would be perfectly possible to have a reactance element behaving as a variable capacitor at the point 12 and, of course, the corresponding configurations with a reactance element behaving as an inductance can be used.

I claim:

1. In an instrument scanning across a radiation discontinuity with a detector having a time constant substantially longer than the scanning time across the discontinuity which therefore produces a signal in the form of trapezoidal pulses, the instrument requiring for precise indication a substantially rectangular pulse form, the improvement which comprises processing circuits including (a) amplifying means having an input circuit for the trapezoidal pulses,
(b) a circuit having varying degrees of discrimination in favor of high frequencies,
(c) means for varying said high frequency discrimination, and
(d) amplified input signal actuating means for actuating said high frequency discrimination varying means whereby the discrimination in favor of high frequencies increases with increasing input signal.

2. Processing circuits according to claim 1 in which the high frequency discrimination is continuously variable.

3. Processing circuits according to claim 2 in which the high frequency discriminating circuits include amplifying circuits with a feedback loop, said loop including a reactance element and means for connecting the control of said reactance element to the input signal actuated means.

4. Processing circuits according to claim 3 in which the reactance element is connected to a rectifying circuit the input of which is connected to a portion of the input signal.

5. Processing circuits according to claim 1 in which the high frequency discrimination is in steps and the signal actuated means for varying high frequency discrimination comprises gates for introducing steps of high frequency discrimination.

6. Processing circuits according to claim 5 in which the high frequency discriminating circuits are in series each shunted by a normally short circuiting gate circuit.

7. Processing circuits according to claim 1 in which the instrument is a radiation dimensional gage for measuring the width of an object gaged.

References Cited by the Examiner
UNITED STATES PATENTS

| | | | |
|---|---|---|---|
| 2,497,129 | 2/50 | Liston | 250—83.3 |
| 2,659,823 | 11/53 | Vossberg | 250—59 |
| 3,039,006 | 6/62 | Weiss | 250—83.3 X |
| 3,056,047 | 9/62 | Coolie-Yarborough | 307—88.5 |

RALPH G. NILSON, *Primary Examiner.*